Feb. 2, 1943.  J. W. HARVEY  2,309,902
FISH LURE
Filed Sept. 2, 1941
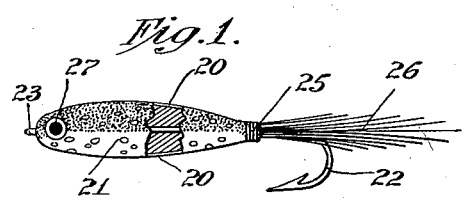
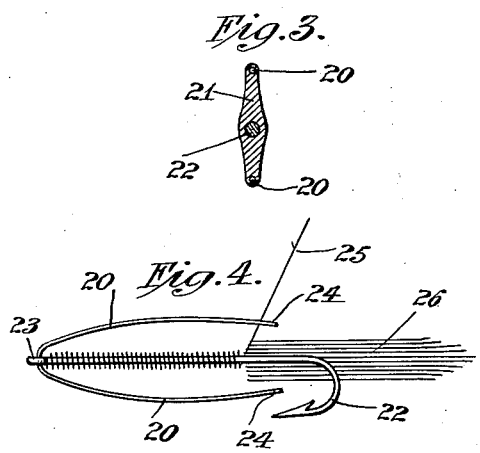
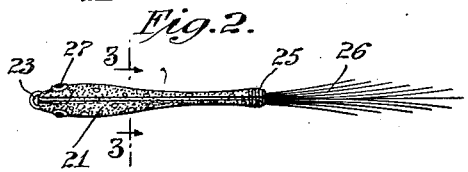
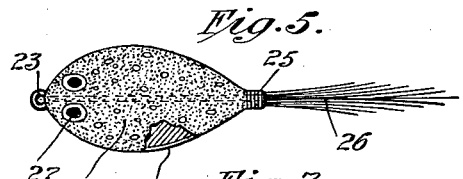
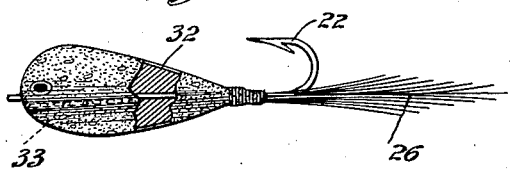
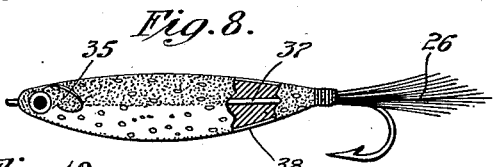
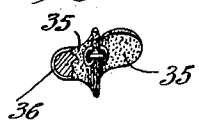
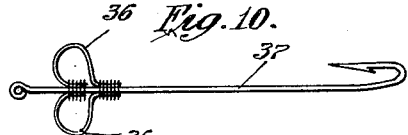
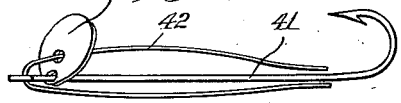
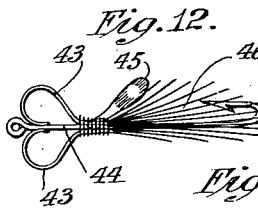
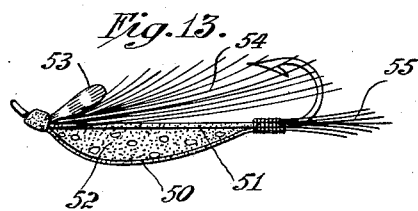
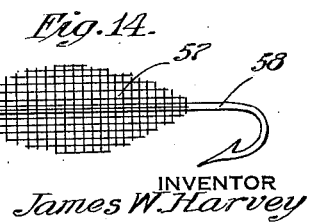
INVENTOR
James W. Harvey
BY
ATTORNEY Patented Feb. 2, 1943

2,309,902

UNITED STATES PATENT OFFICE 2,309,902

FISH LURE

James W. Harvey, Lakeville, Conn., assignor of one-half to Robert S. Allyn, New York, N. Y., and one-half to Starr Allyn Harvey, Lakeville, Conn.

Application September 2, 1941, Serial No. 409,189

17 Claims. (Cl. 43—42)

My invention relates particularly to lures commonly called fish lures.

One object is to provide an attractive lure that can be made cheaply and yet which will be durable and effective.

Another object is to provide a method of manufacture which can be carried out practically and cheaply.

The drawing shows several different embodiments of my improved lures and the parts from which they are made.

Fig. 1 is a side view of a lure embodying a simple form of my invention, parts being broken away.

Fig. 2 is a plan view of the same.

Fig. 3 is a transverse sectional view on the plane of the line 3—3 of Fig. 2.

Fig. 4 is a detail view showing parts of the lure of Figs. 1 to 3, constituting the skeleton of the lure.

Fig. 5 is a plan view of another form of my invention.

Fig. 6 is a side view of another form of my invention.

Fig. 7 is an end view of the form shown in Fig. 6.

Fig. 8 is a side view and partial section of another form having propeller-like side fins.

Fig. 9 is an end view and partial section of the same.

Fig. 10 is a plan view of a hook with a propeller frame for use in making a lure of my invention.

Fig. 11 is a side view of a hook, a frame wire and an attached spoon for another form of my invention.

Fig. 12 is a side view of a lure of my invention partially formed.

Fig. 13 is a side view of another form of lure embodying my invention.

Fig. 14 is a side view of a frame or skeleton for another form of my invention.

The lure comprises a frame 20 of suitable shape with a filling and coating of a plastic substance, such as a transparent lacquer constituting a body 21 attached to the shank of a hook 22. Preferably the hook has an eye 23 and the frame is a filament of wire passed through the eye and having its ends 24 secured to the shank by a number of windings of thread 25. The same thread may be used to secure tail pieces 26 to the shank of the hook. The frame may be of gut or a material like nylon instead of wire but should be strong enough to hold the desired shape. After the frame is secured to the hook, the frame and the shank within it are coated with a fluid lacquer which may be applied by a brush or by dipping the frame in the lacquer which is then permitted to dry. This lacquer is preferably stirred so as to form small bubbles of air which serve to reflect light and produce the effect of iridescent scales. Preferably several coats of the lacquer are applied successively. After each coat the lure is slowly rotated so as to prevent the lacquer from running off.

In making the larger sizes, the dipping method is by far the most rapid. Several of the skeletons can be readily dipped at one time.

After the first or second coat has dried, eye discs 27 are preferably cemented to the body and another coat is applied over the entire body including the eye discs. The first coat is preferably of rather slow drying characteristics so that it will not warp the frame out of shape. The later coating is preferably of quicker drying characteristics so as to provide a harder outer skin.

The lacquer may be of any suitable color but preferably the lower half is transparent. The upper half may be of a solid color.

The form shown in Fig. 5 has a flat body 30 with a frame 31 attached to the opposite ends of the shank of the hook in any suitable manner.

In the form of Figs. 6 and 7, the frame consists of two parts 32 and 33. The part 32 is similar to the part 20 of Fig. 1 although of somewhat different shape. The other part 33 is secured in a plane substantially at right angles to the plane of part 32.

The lure of Figs. 8 and 9 is similar to that of Figs. 1 to 4 but in addition I have provided a lateral fin 35 on each side. This fin is formed of a wire loop 36 attached to the shank 37 of the hook which is coated or dipped in lacquer at the same time as the main frame 38 and the shank of the hook. By twisting these fin loops in opposite directions, the fins will constitute propeller blades which will cause the lure to rotate on its longitudinal axis when trolled through the water. Of course a single fin or two fins both inclined in the same direction will serve to make the lure sway from side to side or up and down but without rotation.

Fig. 11 shows a modified form of frame with a spoon 40 threaded on the shank 41 of the hook and on the wire 42 near the eye of the hook. The other end of the frame is secured suitably to the hook which is then dipped or coated with several layers of the lacquer thus producing a lure that will wabble or dart when drawn through the water. The lacquer holds the spoon in place.

In Fig. 12, the hook has loops 43 attached to the shank 44 of the hook near the eye end and intended to be filled and coated with lacquer as previously described. This form has one or more eye or wing elements 45 and hair or hackle members 46 suitably secured to the hook shank.

Fig. 13 shows a frame member 50 secured at one side of the hook shank 51 so that the body 52 will lie only on one side of the hook. Elements such as an eye 53, hair 54 and tail piece 55 may be provided.

Fig. 14 shows the skeleton or frame of another form where the woven mesh 57 is suitably secured to the hook 58 and then dipped in or coated with several layers of lacquer as previously described.

A suitable lacquer consists of a heavy solution of nitrocellulose in a solvent such as ethyl acetate or amyl acetate and ethyl alcohol. The first coat may contain a plasticizer such as castor oil. Subsequent coats may be diluted with a thinner such as mineral spirits. Such a composition when dried is hard on the surface but quite flexible. There is therefore little danger of the body being damaged when in use. Such a lacquer is not damaged by any ordinary livable temperature or by salt or fresh water and does not soften or become tacky.

Obviously these lures may be made in any size and highly ornamental. They are quite cheap to make and yet durable and effective.

The lacquer not only provides a body but also serves to hold together the various parts including the hook, and the frame as well as the wings, fins, tails and such other attachments as may be used.

I claim:

1. A lure comprising a shank, a wire loop connected to the shank and filled and coated with a lacquer, at least a part of which is transparent, the loop constituting the margin of the body of the lure.

2. A lure comprising a shank, a wire frame connected to the shank and coated and filled with a transparent lacquer containing air bubbles.

3. A lure having a body with a peripheral frame, a body of translucent plastic in the frame, an eye-simulating disc cemented to one end of the body and tail elements secured in the opposite end of the body.

4. A lure having a body with a peripheral frame, a body of translucent plastic in the frame, an eye-simulating disc secured to one end of the body, and tail elements secured in the opposite end of the body.

5. A lure having a body with a peripheral frame, a body secured in the frame, an eye-simulating disc cemented to one end of the body, tail elements secured in the opposite end of the body, and a hard transparent coating enclosing the frame, the body and the eye disc.

6. A lure comprising a hook with a wire frame secured thereto and propeller blade loops secured to opposite sides of the hook, the hook shank, the frame and the propeller blade loops being coated and filled with a hardened lacquer.

7. A lure comprising a hook shank having a wire frame and a wire loop all filled and coated with a hardened lacquer, the loop forming the border of the lure.

8. A lure having a wire skeleton filled and coated with a number of layers of lacquer successively applied, the skeleton forming the border of the lure.

9. A lure comprising a hook having a shank, a wire loop connected to said shank and projecting laterally therefrom, a frame connected to said shank, and a body of transparent plastic fitting the frame and the loop.

10. A lure comprising a hook having a shank, a pair of oppositely projecting wire loops secured to said shank, and plastic material filling and covering said loops and constituting propeller-like blades for rotating the lure when it is drawn through the water.

11. A lure comprising a hook, a wire loop connected at both ends to the shank of the hook and an integral body of translucent lacquer coating the shank and the loop.

12. A fish lure comprising a hook having a shank, a body frame secured thereto, a propeller blade secured at one end of the body frame, and an integral coating of a hardened lacquer over the frame and blade.

13. A fish lure comprising a hook having a shank, a pair of wire loops projecting laterally from the shank and filled with hardened lacquer to constitute deflecting blades.

14. A fish lure comprising a hook having a shank, a wire loop having its ends connected to the shank, a body consisting of a plurality of layers of lacquer consecutively applied, the inner layer having a slow drying characteristic and the outer layer having a quicker drying characteristic and forming a hard skin.

15. A fish lure comprising a barbed hook having a shank with an eye at one end, a border filament looped through said eye and having its two ends secured to the shank near the barbed end and a body of hardened lacquer coating and filling the border filament loop and in which a part at least of the shank is embedded.

16. A fish lure comprising a hook having a shank, a body attached thereto including wire loops attached to one end of the shank and hardened plastic material filled within the wire loops and forming therewith deflecting members.

17. A fish lure comprising a hook having a shank, a tail secured to the shank and projecting beyond the barb of the hook, a plastic body permanently adhering to the shank of the hook and anchoring the tail thereto, and an eye secured to the plastic body at one side of the end opposite the tail.

JAMES W. HARVEY.